July 8, 1924.
J. W. SEWELL
CRANK SHAFT AND CONNECTION ROD BEARING
Filed March 6, 1922   2 Sheets-Sheet 1
1,500,902
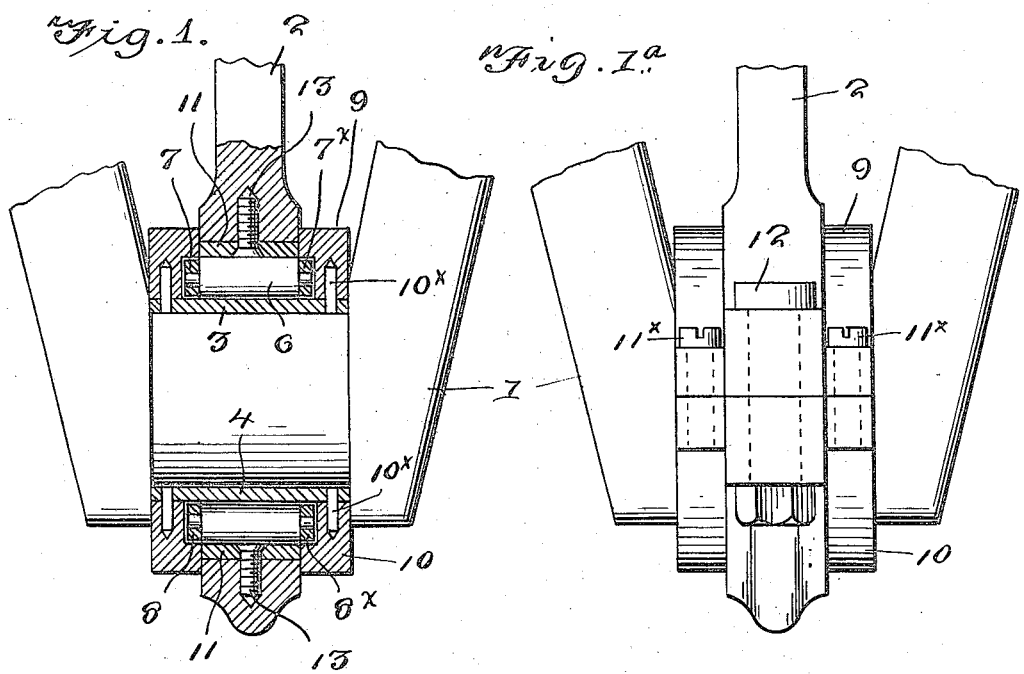
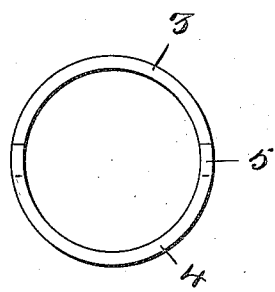
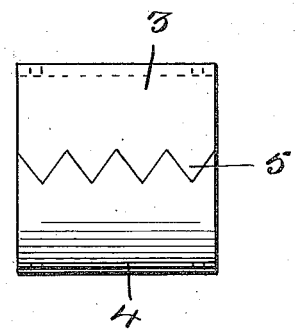
J. W. Sewell
INVENTOR
BY Victor J. Evans
ATTORNEY Patented July 8, 1924.

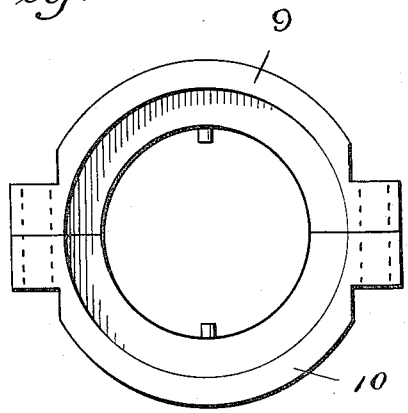
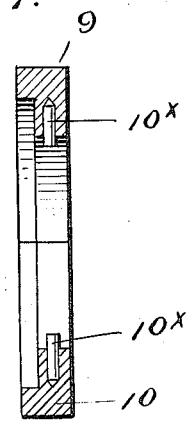
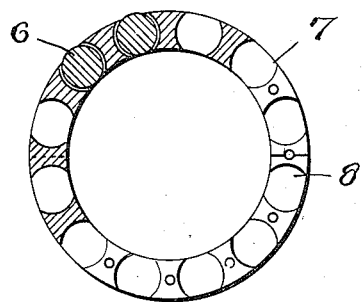
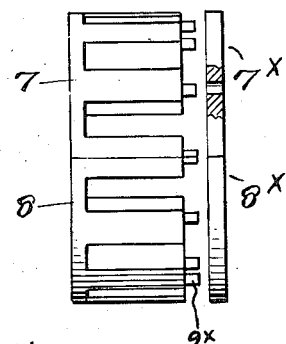
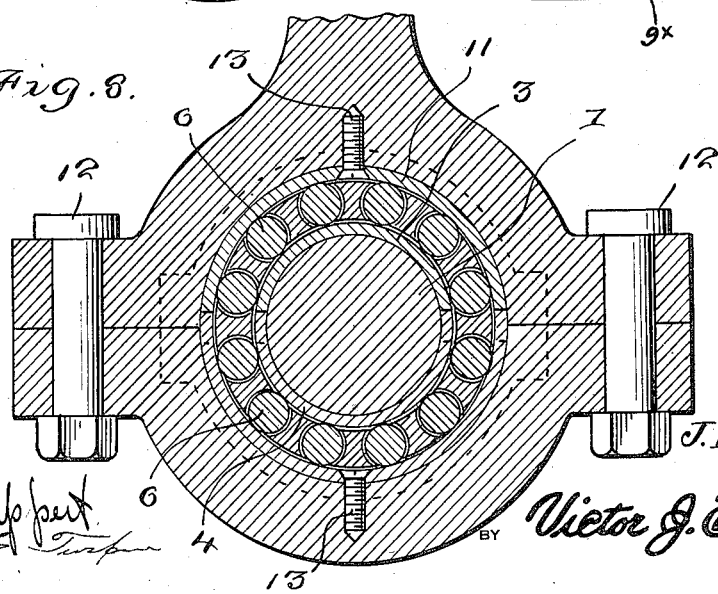

1,500,902

UNITED STATES PATENT OFFICE.

JOHN W. SEWELL, OF ALTON, ILLINOIS.

CRANK-SHAFT AND CONNECTION-ROD BEARING.

Application filed March 6, 1922. Serial No. 541,384.

*To all whom it may concern:*

Be it known that I, JOHN W. SEWELL, a citizen of the United States, residing at Alton, in the county of Madison and State of Illinois, have invented new and useful Improvements in Crank-Shaft and Connection-rod Bearings, of which the following is a specification.

My said invention has for its object the provision of a simple and inexpensive crank shaft and connection rod bearing and one susceptible of being expeditiously produced and easily installed and adapted to reduce the friction incident to operation to a minimum, thereby averting burnt-out bearings on flat crank shaft bearings.

To the attainment of the foregoing, the invention consists in the improvement as hereinafter described and definitely claimed.

In the accompanying drawings, forming part of this specification:—

Figure 1 is a view partly in section and partly in elevation showing the application of my novel bearing to a crank shaft.

Figure 1$^a$ is an elevation of the same.

Figures 2 and 3 are detail views of the sectional bushing.

Figures 4 and 5 are views showing the anti-friction rollers and the sectional spider combined with the same.

Figures 6 and 7 are views of one of the clamps in which the bushing sections are held.

Figure 8 is an enlarged section taken through one of the bearings and showing the same complete.

Similar numerals of reference designate corresponding parts in all of the views of the drawings.

I illustrate my novel bearing in conjunction with a crank shaft 1 and a connecting rod 2. Among other elements the bearing comprises a bushing made up of sections 3 and 4. The said sections 3 and 4 are adapted to be sprung over the appropriate portion of the crank-shaft, and the meeting ends of the sections are toothed as indicated by 5 and best shown in Figures 2 and 3, the said toothed ends being intermeshed or interlocked as illustrated with a view to preventing the rollers designated by 6 from chipping the bearings as would be the case were the ends of the sections 3 and 4 cut square.

In addition to the bushing sections 3 and 4 and the anti-friction rollers 6, the bearing comprises spiders each made up of two semi-circular sections 7 and 8, the ends of which are opposed as best shown in Figure 4, and detachable semi-circular side sections 7$^x$ and 8$^x$, pinned at 9$^x$ to the sections 7 and 8, and designed to contribute to ease of assembly. The rollers 6 are mounted in spaced relation in the spider sections 7 and 8 and 7$^x$ and 8$^x$ so as to bear against and be interposed between the bushing sections 3 and 4, and the housing made up of sections 9 and 10, pinned at 10$^x$ to the bushing sections 3 and 4. It will be readily noted that the housing sections 9 and 10 serve to receive and hold the bushing sections, the spider sections and the anti-friction rollers, and also serve as side bearings, the anti-friction rollers being also interposed between the bushing sections 3 and 4 and the lining portions 11 of the connecting rod sections which are interposed between the two housings and connected together by bolts 12. Screws 13 detachably connect the lining portions 11 to the rod sections, and screws 11$^x$, Figure 1$^a$, connect the housing sections 9 and 10 together.

In virtue of the construction shown and described it will be manifest that my novel connection is easy to install and assures smooth running. It will also be manifest that the connection includes no adjustments such as are likely to get out of order after a short period of use, and that all of the parts can be readily removed when necessity demands and replaced with new parts at small cost. In connection with the installation of the improvement, it will be noted that the same can be readily carried out.

In addition to the practical advantages ascribed to the bearing it will be noted that the same is strong and durable and is therefore well adapted to withstand the hard usage to which constructions of corresponding character are ordinarily subjected.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. The combination of a crank shaft having spaced portions, and a portion of circular form in cross-section intermediate of said spaced portions, a bushing interposed between said spaced portions of the crank shaft and surrounding the intermediate portion of the shaft, a connecting rod having sections detachably connected together and surrounding and spaced from said bushing, pairs of housing sections surrounding and pinned to the bushing and interposed between the said portions of the crank shaft and the sides of the connecting rod, the sections in each pair being detachably connected together, a lining arranged in and connected to the sections of the connecting rod, a circular series of anti-friction rollers surrounding the bushing and interposed between and bearing against said bushing and said lining, and spider sections of annular form surrounding the bushing and interposed between the pairs of housing sections and pinned together, one of said spider sections receiving and maintaining in spaced relation the said anti-friction rollers.

2. The combination of a crank shaft having spaced portions and also having a portion of circular form in cross-section intermediate of said spaced portions, a connecting rod surrounding and spaced from said intermediate portion of the crank shaft, a bushing surrounding and contacting with said intermediate portion of the crank shaft and interposed between the spaced portions of the crank shaft, a lining in the connecting rod, a circular series of anti-friction rollers interposed between and bearing against said bushing and said lining, housings surrounding the bushing and interposed between the spaced portions of the crank shaft and the sides of the connecting rod, and spider sections interposed between said housings and surrounding the bushing, one of said sections receiving and maintaining in spaced relation the anti-friction rollers.

3. The combination of a crank shaft having spaced portions and an intermediate portion, of circular cross-section, between said spaced portions, a connecting rod surrounding and spaced from said intermediate portion of the crank shaft, housings surrounding the intermediate portion of the crank shaft and interposed between the sides of the connecting rod and the spaced portions of said shaft, and anti-friction means interposed between the intermediate portion of the crank shaft and the connecting rod and confined between the said housings.

In testimony whereof I affix my signature.

JOHN W. SEWELL.